United States Patent [19]

Rodstein, deceased et al.

[11] Patent Number: 4,901,755
[45] Date of Patent: Feb. 20, 1990

[54] VALVE HOUSING FOR CARTRIDGE TYPE FAUCETS

[76] Inventors: Harvey B. Rodstein, deceased, late of Los Angeles, Calif.; by Barbara L. Rodstein, executrix, 1171 Robert La., Los Angeles, Calif. 90024

[21] Appl. No.: 325,042

[22] Filed: Mar. 14, 1989

Related U.S. Application Data

[63] Continuation of Ser. No. 212,085, Jun. 27, 1988, abandoned, which is a continuation of Ser. No. 101,772, Sep. 28, 1987, abandoned.

[51] Int. Cl.⁴ ............................................. F16K 27/06
[52] U.S. Cl. .................................. 137/454.5; 251/367; 251/192
[58] Field of Search ........................... 137/454.5, 454.6; 251/182, 192, 367

[56] References Cited

U.S. PATENT DOCUMENTS

| | | | |
|---|---|---|---|
| 3,780,758 | 12/1973 | De Vries | 137/454.6 |
| 4,256,163 | 3/1981 | Orszullok | 137/454.5 |
| 4,314,581 | 2/1982 | Schrock | 137/454.5 |
| 4,331,176 | 5/1982 | Parkison | 137/454.5 |
| 4,425,935 | 1/1984 | Gonzalez | 137/454.6 X |
| 4,699,170 | 10/1987 | Diephuis et al. | 137/454.5 |

Primary Examiner—John Fox
Attorney, Agent, or Firm—Gene W. Arant; Matthew F. Jodziewicz

[57] ABSTRACT

A cartridge valve housing for use with a disc-type valve cartridge having a pair of discs disposed at one end and capable of axial adjustment of the discs independent of the housing. The valve housing includes a hollow tube member having an inlet and an outlet port and a passageway suitable for communicating liquid therebetween. A portion of the tube member, proximate the outlet port, is adapted to slidably and sealingly receive therein the valve cartridge end having the pair of discs. This portion of the tube member also has sufficient axial length so as not to inhibit axial movement of the valve cartridge in the housing. A concentric sleeve member is integrally formed on the outer wall of the tube member proximate the outlet port and forms a discharge chamber therebetween. The discharge chamber has a valve cartridge entry port aligned with the outlet port of the tube member and is adapted to threadably receive the valve catridge therethrough so as to permit the valve cartridge to selectively provide a fluid passageway for communicating fluid between the outlet port of the tube member through the discharge chamber and into a fluid discharge port in the discharge chamber.

4 Claims, 2 Drawing Sheets

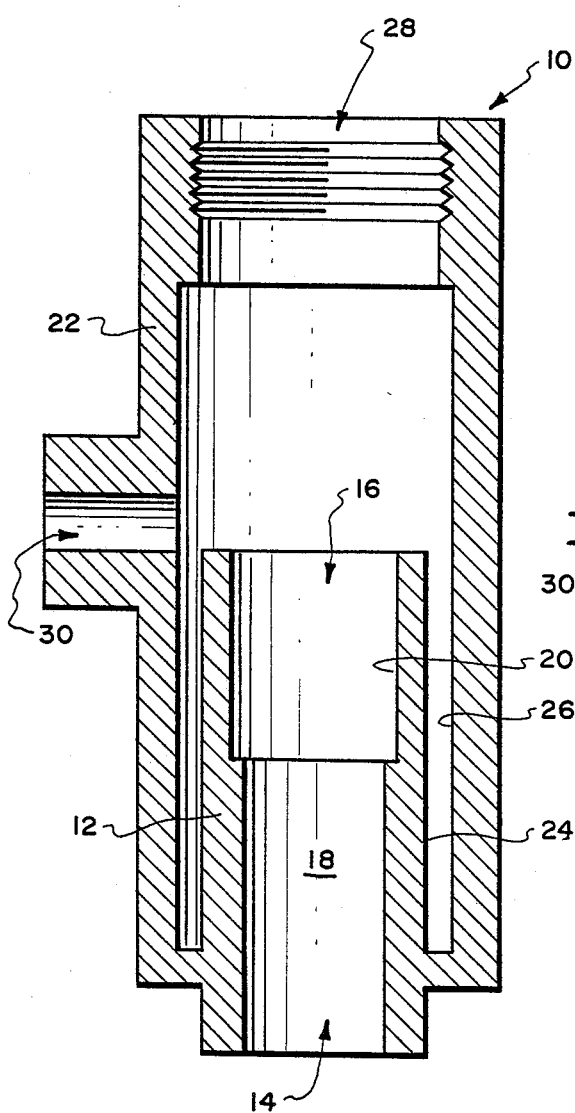
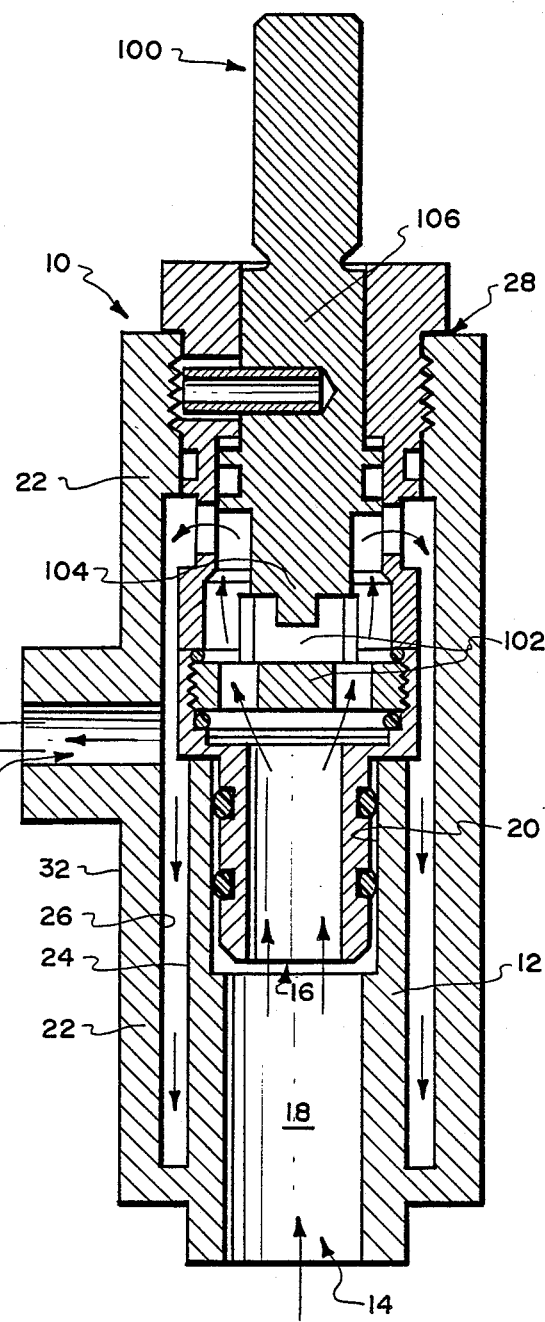
Fig. 1.
Fig. 2.

VALVE HOUSING FOR CARTRIDGE TYPE FAUCETS

This is a continuation of Ser. No. 212,085, filed 6/27/88, now abandoned, which is a continuation of Ser. No. 101,772, filed 9/28/87, now abandoned.

BACKGROUND OF THE INVENTION

1. Field of the Invention

This invention relates in general to valve housings for use with cartridge type faucet valves, and, more particularly, to valve housings for use with cartridge type faucet valves including disc-type valve cartridges capable of axial adjustment of the discs independent of the valve housing.

2. Description of the Related Art

Typically, the standard cartridge faucet type valve involves two separate yet intimately connected assemblies. The first of these assemblies is the valve housing used to convey the water flow from the main water source to the desired sink or basin. The second of these assemblies is the valve cartridge used to throttle the water flow passing through the valve housing so as to provide the user with some degree of control over the water flow.

While these two assemblies are usually constructed separately to what are considered to be mutually acceptable standards of tolerances, they are later joined together into a single working unit where discrepancies in such tolerances can easily produce a defective total unit. The effects of such a defective unit are the well known dripping faucet, the hard to turn handle and the leaking faucet.

Applicant in co-pending application Ser. No. 629,774 filed July 11, 1984, , abandoned disclosed an invention that improved the disc-type valve cartridge used in valves to render it independent of the valve housings normally required for such disc-type valve cartridges. The provisions and discussions of that co-pending application are incorporated herein by reference.

Generally, prior art disc-type valve cartridges required a valve housing that had fixed within it a mating portion for the lower end of the valve cartridge. This mating portion was located in a standard position and conformed to prescribed tolerances. Theoretically, this method of piecemeal manufacturing would produce a workable faucet. However, this construction has shown over the years to be unforgiving of natural and inescapable variations in construction that occur in manufacturing items in quantity. It is virtually impossible in such faucets to correct or adjust a misalignment in the way a valve cartridge would mate with the valve housing. Thus, the ability of a service individual to correct a leaking faucet, or adjust the tension in the faucet handle was at best severely limited. In other words, once the valve housing and valve cartridge were made, little or no further adjustment could be made to either to provide for a better internal fit of the two components.

Applicant in the above cited co-pending application taught an invention that would permit independent adjustment of the valve cartridge independent of the valve housing.

In the present application, Applicant discloses an invention that provides for a housing assembly that will not inhibit adjustment of the valve cartridge being held therein.

SUMMARY OF THE INVENTION

It is an object of the present invention to provide a faucet housing for valve cartridges.

It is another object of the present invention to provide a cartridge valve housing for use with a disc-type valve cartridge having a pair of discs disposed at one end and capable of axial adjustment of the discs independent of said valve housing that does not restrict adjustment of the valve cartridge.

It is yet another object of the present invention to provide a cartridge valve housing that permits adjustment of the valve cartridge independent of the cartridge valve housing.

It is still another object of the present invention to provide a cartridge valve housing that is simple in manufacture and both economical and relatively maintenance free in use.

In summary, the present invention provides a cartridge valve housing for use with a disc-type valve cartridge having a pair of discs disposed at one end and capable of axial adjustment of the discs independent of the housing. The valve housing includes a hollow tube member having an inlet and an outlet port and a passageway suitable for communicating liquid therebetween. A portion of the tube member, proximate the outlet port, is adapted to slidably and sealingly receive therein the valve cartridge end having the pair of discs. This portion of the tube member also has sufficient axial length so as not to inhibit axial movement of the valve cartridge in the housing. A concentric sleeve member is integrally formed on the outer wall of the tube member proximate the outlet port and forms a discharge chamber therebetween. The discharge chamber has a valve cartridge entry port aligned with the outlet port of the tube member and is adapted to threadably receive the valve cartridge therethrough so as to permit the valve cartridge to selectively provide a fluid passageway for communicating fluid between the outlet port of the tube member through the discharge chamber and into a fluid discharge port in the discharge chamber.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

BRIEF DESCRIPTION OF THE DRAWINGS

FIG. 1 is a cross-sectional view of a valve housing constructed in accordance with the present invention;

FIG. 2 is a cross-sectional view of a valve housing similar to that of FIG. 1 further including an axially independent adjustable valve cartridge assembly being inserted therein.

DESCRIPTION OF THE PREFERRED EMBODIMENTS

Figure 3:
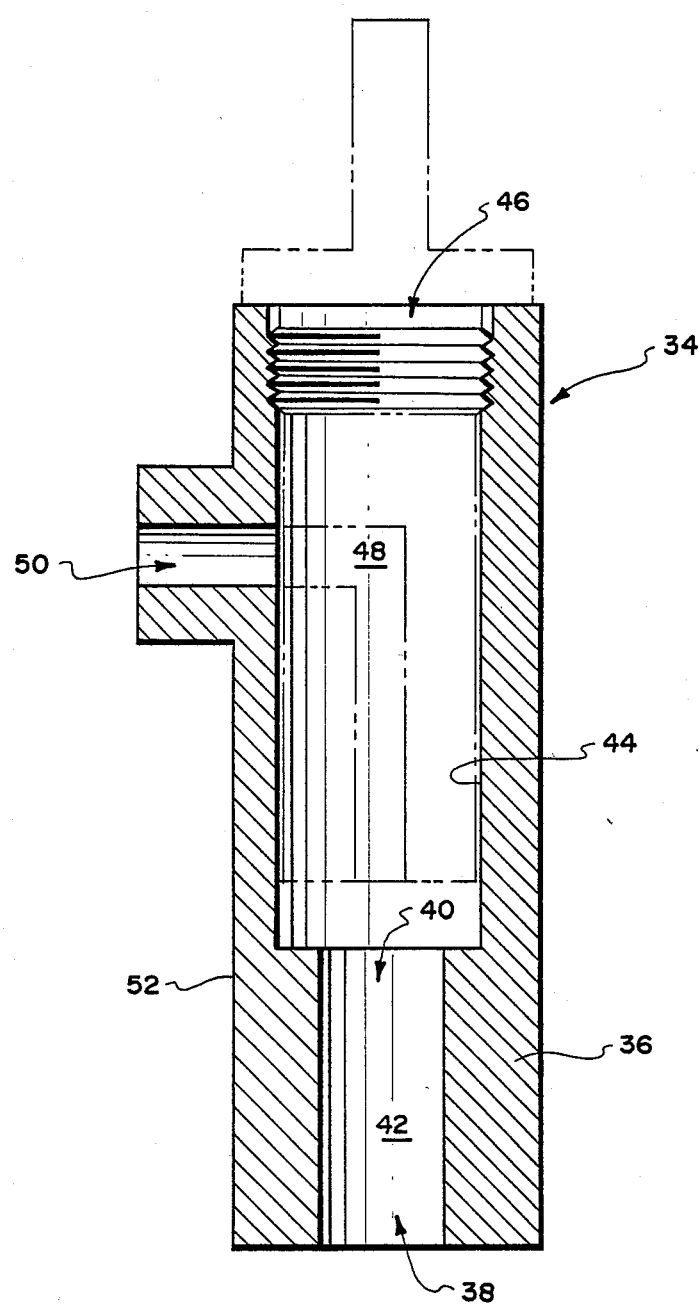
FIG. 3 is a cross-sectional view of an alternate valve housing constructed in accordance with the present invention.

Referring now to the drawings, in FIG. 2 there is shown a preferred cartridge valve housing 10 for use with a disc-type valve cartridge assembly generally indicated by reference arrow 100. FIG. 1 shows valve housing 10 without having the valve cartridge assembly 100 inserted therein for ease of examination.

Valve cartridge assembly 100 has a pair of discs 102 disposed at one end 104 of the cartridge body 106. Valve cartridge assembly 100 is capable of axial adjustment of the discs 102 independent of the valve housing 10, as is better described in my co-pending application Ser. No. 629,774 filed on July 11, 1984, which description is incorporated herein by reference and may be referred to for an explaination of the workings of an independently adjustable disc-type valve cartridge assembly.

Valve housing 10 includes a hollow tube member 12 having inlet and outlet ports 14, 16, respectively, and a passageway 18 suitable for communicating liquid therebetween.

Valve housing 10 may be cast as a single piece from metal material or may be formed from any of the currently available synthetic materials capable of withstanding the pressures and wear of constant exposure to water.

This invention permits the casting of the valve housing 10 as a single, integral piece due to its ability to house a valve cartridge assembly 100 that is axially adjustable independent of the valve housing 10 in order to control the axial pressure and therefore turning torque applied to the discs 102.

A portion 20 of tube member 12, proximate outlet port 16, is adapted to slidably and sealingly receive therein valve cartridge end 104 having the pair of discs 102. It is essential that portion 20 of tube member 12 has sufficient axial length so as not to inhibit axial movement of the valve cartridge 104 in valve housing 10.

In general, portion 20 of tube member 12, is adapted to slidably receive valve cartridge end 104 therein by having a bore larger than that of the remainder of tube member 12 as is shown in FIGS. 1, 2 and 3. The bore of tube member 12 may be enlarged by drilling, or the like, being applied to portion 20 of tube member 12 after valve housing 10 has been manufactured as by casting or like manufacturing process. In this manner, valve housing 10 may be economically and quickly manufactured by casting it as a single, integral piece and then machining it to its final desired form by drilling, threading, or tapping the appropriate areas of the cast piece. Unlike the prior art, a suitable mating piece to receive valve cartridge end 104 and discs 102 need not be joined, as by welding or gluing to valve housing 10 and more specifically to portion 20 of tube member 12.

A concentric sleeve member 22 is integrally formed on the outer wall 24 of tube member 12 proximate outlet port 16 and forms a discharge chamber 26 therebetween.

Discharge chamber 26 has a valve cartridge entry port 28 aligned with the outlet port 16 of tube member 12. Valve cartridge entry port 28 is adapted to threadably receive the valve cartridge assembly 100 therethrough so as to permit the valve cartridge assembly 100 to selectively provide a fluid passageway for communicating fluid between out port 16 of tube member 12 through discharge chamber 26 and into a fluid discharge port 30 formed in a side wall 32 of discharge chamber 26. The fluid may be directed to the spout area of the faucet or to any other desired area at this point. The solid headed arrows appearing in FIG. 2 indicate fluid flow through the valve assembly.

While fluid discharge port 30 is shown in the FIGURES as being transverse a longitudinal axis of tube member 12, it may be placed at any desired angle for the faucet design being considered.

An alternate embodiment of a valve cartridge housing for use with a disc-type valve cartridge having a pair of discs disposed at one end and capable of axial adjustment of the discs independent of the valve housing appears in FIG. 3.

In FIG. 3, for ease of examination, the valve cartridge assembly is not shown. Valve housing 34 includes a hollow tube member 36 having inlet and outlet ports 38, 40, respectively, and a passageway 42 for communicating liquid therebetween.

A portion 44 of tube member 36 proximate outlet port 40 is adapted to slidably receive therein the valve cartridge assembly end having the discs (shown in dotted outline only). Portion 44 of tube member 36 has sufficient axial length not to inhibit axial movement of the valve cartridge assembly in the valve housing 34.

Tube member 36 also has a valve cartridge assembly entry port 46 aligned with outlet port 40 adapted to threadably receive the valve cartridge assembly therethrough. In this fashion, the valve cartridge assembly is threadably received therein to selectively provide a fluid passageway 48 for communicating fluid between outlet port 40 through the valve cartridge assembly and to a fluid discharge port 50 located on the outer wall 52 of tube member 36.

It should be noted that this alternative embodiment of the invention bears a resemblance to the first preferred embodiment described above, except that the concentric discharge chamber has been eliminated. While it is believed that the first presented embodiment of the invention is the most efficient, it is also believed that the discharge chamber may also be eliminated without destroying the invention.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. The combination of a cartridge type valve assembly and a housing for removably receiving said valve assembly while retaining adjustability of the turning torque for operating the valve independently of seating said valve assembly in said housing, comprising:

said housing being integrally formed and having a generally elongated tubular exterior wall adapted to be vertically disposed, said tubular exterior wall having an open upper end which is interiorly threaded, said exterior wall having an opening formed therein about midway of its length to provide an outlet port;

said housing also including an interior tubular wall which is concentric to and spaced inwardly from said exterior wall and which extends from said outlet port downwardly to said lower end of said exterior wall, said housing at its lower end having a radially extending wall which circumferentially joins the lower ends of said interior and exterior walls, thereby forming an annular cavity between said interior and exterior walls;

said valve assembly having a threaded base received in said interiorly threaded upper end of said exterior wall of said housing, said valve assembly being of the disc type and having a lower end which projects into said interior wall and has a disc retainer threadably supported thereon which may be axially adjusted for adjusting the turning torque for operating the valve, and for removal and replacement of the discs of said valve assembly;

the interior surface of the upper end portion of said interior wall being drilled to a larger diameter than the interior surface of the lower end thereof, and said valve assembly lower end extending into the drilled portion of said interior wall but not the full length of said drilled portion, so that said lower end of said valve assembly is slidably and sealingly received therein with room for axial adjustment by threadably advancing or retreating said threaded base along said lower end of said valve assembly and thereby permitting selected adjustment of the turning torque between the discs of said valve assembly for operation of the valve; and the open lower end of said interior wall providing an inlet port, and said annular cavity providing a reservoir into which liquid may flow after passing from said inlet port through said valve assembly and before passing to said outlet port.

2. The apparatus of claim 1 wherein said valve assembly has an inlet opening in its lower end, and an outlet opening which is above the elevation of said outlet opening of said housing.

3. The apparatus of claim 1 wherein said valve assembly has an inlet opening in its lower end, and an outlet opening which is above the elevation of said interior wall of said housing.

4. The combination of a cartridge type valve assembly and a housing for removably receiving said valve assembly while retaining adjustability of the turning torque for operating the valve independently of seating said valve assembly in said housing, comprising:

said housing being integrally formed and having a generally elongated tubular wall adapted to be vertically disposed, said tubular wall having an open upper end which is interiorly threaded, said wall having an opening formed therein about midway of its length to provide an outlet port;

said valve assembly having a threaded base received in said interiorly threaded upper end of said wall of said housing, said valve assembly being of the disc type and having a lower end which projects into the lower portion of said housing and having a disc retainer threadably supported thereon which may be axially adjusted for adjusting the turning torque for operating the valve, and for removal and replacement of the discs of said valve assembly; and the interior upper surface of said lower portion of said housing wall being drilled to a larger diameter than the interior surface of the lower extremity thereof, and said valve assembly lower end extending into said drilled portion of said housing wall but not the full length of said drilled portion, so that said lower end of said valve assembly is slidably and sealingly received therein with room for axial adjustment by threadably advancing or retreating said threaded base along said lower end of said valve assembly and thereby permitting selected adjustment of the turning torque between the discs of said valve assembly for operation of the valve.

* * * * *